T. K. IRWIN.
TREATMENT OF SEWAGE AND THE LIKE.
APPLICATION FILED JUNE 1, 1915.
1,166,373.
Patented Dec. 28, 1915.
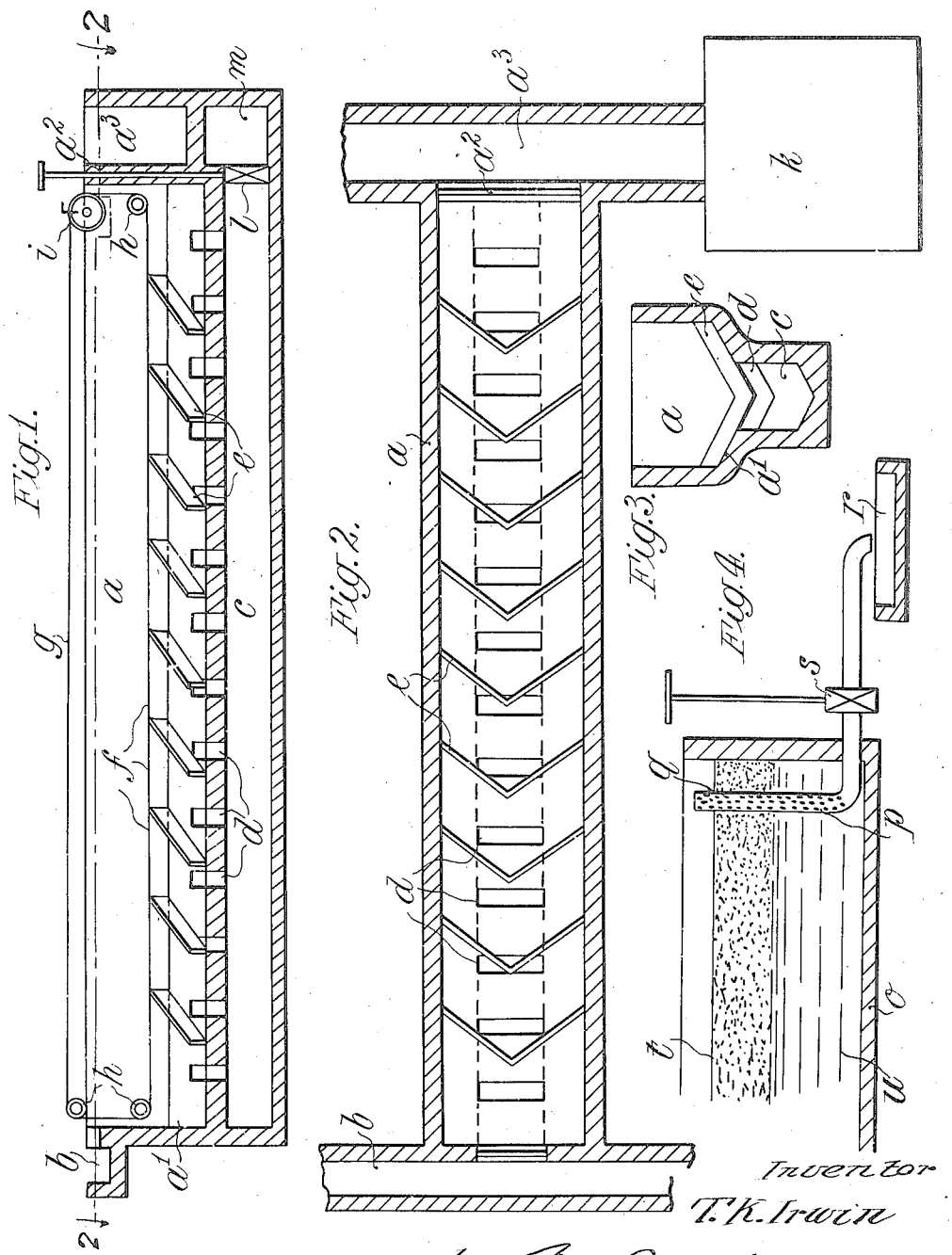
Inventor
T. K. Irwin
by Jno Davis
Atty.

UNITED STATES PATENT OFFICE.

THOMAS KEMPLAY IRWIN, OF WESTMINSTER, LONDON, ENGLAND, ASSIGNOR TO ANGLO-CONTINENTAL FERTILIZERS SYNDICATE LIMITED, OF LONDON, ENGLAND.

TREATMENT OF SEWAGE AND THE LIKE.

1,166,373.  Specification of Letters Patent.  Patented Dec. 28, 1915.

Application filed June 1, 1915. Serial No. 31,623.

*To all whom it may concern:*

Be it known that I, THOMAS KEMPLAY IRWIN, a subject of His Majesty the King of England, residing at Westminster, London, Kingdom of England, have invented certain new and useful Improvements in or Connected with the Treatment of Sewage and the like, of which the following is a specification.

This invention relates to improvements in or connected with the treatment of sewage and the like.

Heretofore it has been proposed to effect the precipitation of sewage sludge by means of chemicals adapted to increase the manurial value of the precipitated sludge, and for such purposes it has also been proposed to employ an elongated precipitation tank having inclined bottom surfaces and a central sludge channel for the collection of the deposited sludge.

Now according to the present invention the tank is made sufficiently long so that the precipitation is effected during the period in which the liquid is traversing its length and reciprocating means in contact with the inclined bottom surface of the tank are also provided for periodically removing the sludge from the inclined bottom of the tank and for discharging it into the sludge channel.

The percentage of precipitant used is regulated by the quantity required in the resulting manure, and, as this percentage in practice is a quantity largely in excess of the amount which would be used in ordinary circumstances for precipitation only, it follows that, not only is the function of precipitation itself carried on without, or at a very greatly reduced, cost, but that, being effected by means of a large excess of precipitant the process is greatly accelerated, and the size of the tanks required for precipitation is considerably reduced.

I use preferably a basic or acid phosphate and in such case the quantity used may be up to 35% of the dry solids in the sludge according to the reaction of the sewage or other liquid to be treated but other similarly valuable manurial constituents may be adopted and may in certain cases prove specially suitable for the purpose.

The precipitation is carried on in tanks which are long relatively to their breadth, and which have bottoms sloping to culverts or channels, either disposed centrally or at one or both sides of the tanks. Such tanks and other apparatus are shown in the accompanying drawings in which:—

Figure 1 is a vertical longitudinal section through the tank; Fig. 2 is a horizontal section on the line 2—2 of Fig. 1; Fig. 3 is a vertical transverse section; and Fig. 4 is a detail view of the drawing-off means applied to a "digestion" tank hereinafter described.

The liquid to be treated is admitted as shown at one end of a tank $a$ from an inlet channel $b$ and traverses it in the direction of its length. The precipitants are usually added to the liquid before its admission to these tanks $a$ so that precipitation takes place during the period in which the liquid is traversing the said tanks. The treated liquid passes from the tank $a$ over a weir $a^2$ into the discharge conduit $a^3$. The central culvert or channel $c$ is in open communication by means of passages $d$ with the tanks $a$ throughout their length, and means are provided for periodically removing the sludge from the bottom of the tanks $d$ into the culverts $c$, and also for drawing off the sludge from the said culverts into a suitable receiving chamber $k$.

The means for removing the sludge from the tank bottoms consist of one or more sets of scrapers $e$ moving or reciprocating over the bottom surface of the tanks and which are connected to each other at $f$ and to an endless chain $g$ passing over pulleys $h$ to a winch $i$ and controlled by hand or power gearing. These scrapers $e$ are operated from time to time in the direction of the length of the tanks, in accordance with the rate at which the sludge is found to accumulate on the bottoms. The sludge will gravitate from the slopes $a'$ into the culvert $c$ when the scrapers $e$ are moved, and thence will flow, by reason of the hydraulic pressure of the liquid in the tanks $a$, into the receiving chamber $k$ before mentioned, through any suitable form of valve or sluice $l$ and channel $m$. This sludge is now admixed with from $\frac{1}{4}$% to 5% of a ferment such as yeast and fermentable organic matter, such as starch waste, sawdust, glucose, yeast, flour mill sweepings, beer wort, dextrin, milk or grape sugar, molasses, or other similar agents, and the temperature of the mixture is raised to about 90° Fahr. It is then run into troughs o Fig. 4 of similar section to the precipitation tanks a already above described but without culverts c and in these tanks a separation of the solids from the more liquid portion takes place under the influence of the ferments. The solids float as shown at t and the liquid u is drawn off through a pipe p of special construction. This pipe is placed vertically in the trough, and is provided with perforations q throughout its length, and of such a size that, whereas the liquid u will pass through them, the "digested" sludge t will not.

Experience shows that a hole about ⅜" in diameter will prevent the passage of the digested sludge, but will allow the separated liquid to flow away freely. This tube p extends the whole depth of the troughs o and communicates with a drainage channel or conduit r and its action is controlled by a valve s operated in any convenient manner.

After the separated liquid u has been drained away, the "digested" sludge t is drawn off through a valve or sluice, not shown, and is passed into a drying machine, and finally powdered and bagged for use.

What I claim as new and desire to secure by Letters Patent of the United States is:—

1. A method of treating sewage for the purpose of making fertilizer which consists in precipitating and separating sludge therefrom, adding ferments to the solid portions whereby said sludge is digested and rises to the surface, and finally drawing off the subsidient liquid.

2. A method of treating sewage for the purpose of making fertilizer which consists in precipitating and separating sludge therefrom, adding ferments and fermentable matter to the sludge whereby the same is digested and solid matters caused to rise to the surface, and finally drawing off the subsidient liquid.

3. A method of treating sewage for the purpose of making fertilizer which consists in adding a definite quantity of chemical fertilizer to the sewage to precipitate the sludge, separating the sludge, adding ferments and fermentable matter to it, whereby it is digested and solid matters are caused to rise to the surface, and finally drawing off the subsidient liquid.

4. A method of treating sewage for the purpose of making fertilizer which consists in effecting the precipitation of the solid matters of the sewage in the form of sludge by gravity while said sewage is flowing by adding chemical fertilizer having manurial value, collecting the precipitate and adding thereto a definite quantity of ferments whereby the solid matters of the precipitate are caused to rise to the surface of the mixture, and finally drawing off the subsidient liquid.

In testimony whereof, I have hereunto signed this sepecification in the presence of two subscribing witnesses.

THOMAS KEMPLAY IRWIN.

Witnesses:
  FRANK BAUER,
  DONALD HALL.